(12) United States Patent
Roty

(10) Patent No.: US 9,539,864 B2
(45) Date of Patent: Jan. 10, 2017

(54) RESONANT-NOISE SUPPRESSOR DEVICE FOR TIRE

(71) Applicants: COMPAGNIE GENERALE DES ESTABLISSEMENTS MICHELIN, Clermont-Ferrand (FR); MICHELIN RECHERCHE ET TECHNIQUE, S.A., Granges-Paccot (CH)

(72) Inventor: Gael Roty, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 71 days.

(21) Appl. No.: 14/358,380

(22) PCT Filed: Oct. 25, 2012

(86) PCT No.: PCT/EP2012/071118
§ 371 (c)(1),
(2) Date: May 15, 2014

(87) PCT Pub. No.: WO2013/072169
PCT Pub. Date: May 23, 2013

(65) Prior Publication Data
US 2014/0299243 A1    Oct. 9, 2014

(30) Foreign Application Priority Data

Nov. 18, 2011  (FR) ...................................... 11 60555

(51) Int. Cl.
*B60C 19/00*    (2006.01)
*B60C 11/13*    (2006.01)
(Continued)

(52) U.S. Cl.
CPC ......... *B60C 19/002* (2013.04); *B60C 11/0309* (2013.04); *B60C 11/042* (2013.04); *B60C 11/13* (2013.01); *B60C 2011/1338* (2013.04)

(58) Field of Classification Search
CPC ................. B60C 11/03; B60C 11/0309; B60C 2011/0339; B60C 2011/0341; B60C 11/04; B60C 11/042; B60C 11/045; B60C 11/047; B60C 11/13; B60C 11/1353; B60C 11/1307; B60C 11/1338; B60C 11/1346; B60C 2011/1361; B60C 19/00; B60C 19/002
(Continued)

(56) References Cited

U.S. PATENT DOCUMENTS

| 4,217,942 A | * | 8/1980 | Takigawa | ............ B60C 11/0316 |
| | | | | 152/209.21 |
| 7,213,625 B2 | * | 5/2007 | Martin | ................... B60C 11/032 |
| | | | | 152/209.17 |
| 2011/0126952 A1 | * | 6/2011 | Nakamizo | ........... B60C 11/0306 |
| | | | | 152/209.21 |

FOREIGN PATENT DOCUMENTS

| DE | 4403662 | * | 8/1995 |
| FR | 2715891 A1 | | 8/1995 |
| JP | H08150812 A | | 6/1996 |

OTHER PUBLICATIONS

International Search Report for PCT/EP2012/071118 dated Jan. 22, 2013.

* cited by examiner

*Primary Examiner* — Eric Hug
(74) *Attorney, Agent, or Firm* — Dickinson Wright PLLC

(57) ABSTRACT

A tread for a tire, this tread having a tread surface intended to come into contact with a road surface and comprising at least one groove of width W and of depth P delimited by two (Continued)

walls facing one another, these walls being joined together by a groove bottom, at least one groove comprising at least one flexible device for at least partially closing this groove as it passes through the contact patch, each flexible device comprising at least one blade of a suitable thickness that allows it to flex under the effect of a circulation of liquid, this blade being borne by a wall delimiting the groove, each blade of thickness E being bounded by a bottom wall facing the bottom of the groove, an end wall facing the other wall of the groove and a contact wall intended to come into contact with the road surface and lateral walls spaced apart by a distance equal to the thickness E of the blade, this tread being such that the bottom wall of the blade comprises a first part referred to as connection part and a second part extending the first part up to the end part of the blade, the connection part being offset towards the outside of the tread with respect to the second part of the bottom wall of the blade so as to form a notch.

6 Claims, 1 Drawing Sheet

(51) Int. Cl.
 *B60C 11/03* (2006.01)
 *B60C 11/04* (2006.01)
(58) Field of Classification Search
 USPC .............................. 152/209.2, 209.3, 209.18, 209.19,152/209.21, 209.22, 900, 901, DIG. 1
 See application file for complete search history.

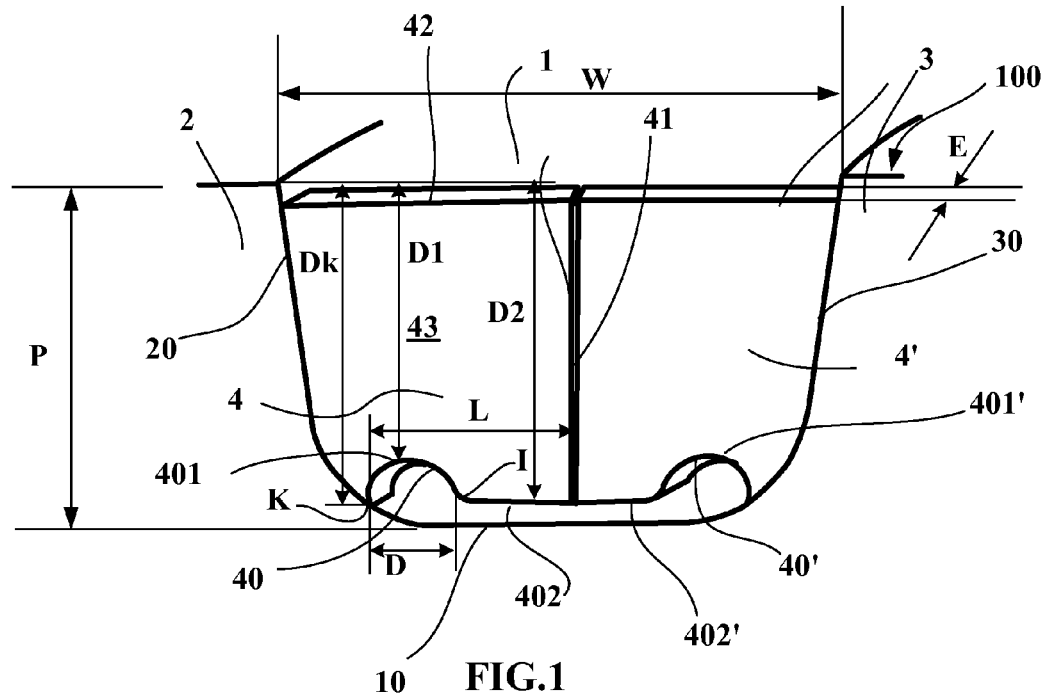
FIG.1
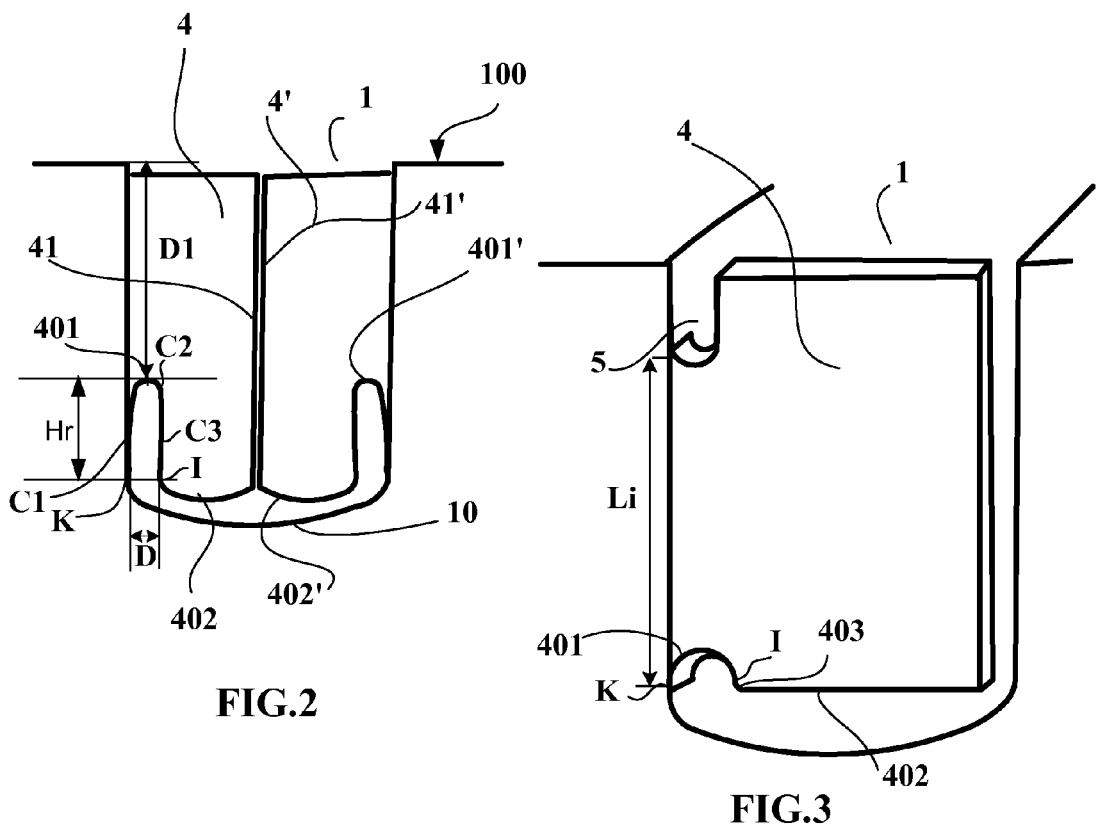
FIG.2
FIG.3

RESONANT-NOISE SUPPRESSOR DEVICE FOR TIRE

This application is a 371 of PCT/EP2012/071118, filed 25 Oct. 2012, which claims benefit of the filing date of FR 1160555, filed 18 Nov. 2011, the entire contents of which is incorporated herein by reference for all purposes

BACKGROUND

1. Field

The present disclosure relates to tire treads and more particularly to treads comprising grooves comprising flexible devices for reducing the noise generated by air going into resonance in these grooves during driving.

2. Description of Related Art

It is known that as a tire that is running comes into contact with a road surface air is made to circulate in a pipe formed by a groove notably a groove of circumferential overall orientation, and the road surface itself, this pipe being open at both ends.

The air in this pipe forms a vibrating air column the resonant frequency of which is dependent on the length between the two ends of the pipe and therefore on the length of groove in contact with the road surface.

This resonance of the air in the grooves has the result of generating, in a vehicle fitted with these tires, a noise inside the vehicle and a noise outside the vehicle.

These inside and outside noises usually correspond to a frequency of 1 kHz or thereabouts, which is a frequency to which the human ear is particularly sensitive. In order to reduce such resonant noise it is known practice to arrange, in each circumferentially oriented or generally circumferentially oriented groove, a plurality of relatively thin closure membranes or blades made of a rubbery material, each closure membrane or blade occupying the entire cross section of the groove or at least a large proportion of this cross section. Each closure membrane may extend from the bottom of the groove or may be fixed to at least one of the walls delimiting the said groove. Relatively thin here means that each closure membrane is able to flex in order to open the cross section of the groove under a flow of liquid notably during wet-weather driving.

Thanks to these closure membranes, the length of the column of air in each circumferential groove is reduced by comparison with the total length of groove in the contact patch, and this leads to a change in the resonant frequency. The frequency is shifted towards resonant frequency values to which the human ear is less sensitive.

Of course, in order to maintain the water clearing function, when driving on a wet road surface, it is necessary for this membrane to be able to flex appropriately under the action of the pressure of the water and thus open the cross section of the groove. Various solutions of this type for reducing the resonance of the air column vibrating in the grooves have been proposed.

One approach is, for example, described in patent documents FR2715891, JP3-276802, JP08-150812, and JP4-221807.

One of the problems encountered with this type of blade fixed to the walls of the groove is the difficulty in achieving fullest closing-off of the cross section of the groove in order to reduce or even eliminate resonance of air in the groove while at the same time making these blades easy to mould and to release from the mould.

Definitions:

The tread surface of a tread corresponds to the surface that comes into contact with the ground when a tire fitted with such a tread is being driven on.

A groove corresponds to a space formed in a tread, the space being delimited by walls of material, these walls being joined together by a groove bottom distant from the tread surface by a distance equal to the depth of the groove. The groove bottom corresponds to that part of the groove that is situated radially underneath the tire wear indicator that indicates the minimum tread depth beyond which the tire tread no longer meets the legal requirements for use.

A block is a raised element formed on a tread, this element being delimited by voids or grooves and comprising lateral walls and a contact face, the latter—which is intended to come into contact with the road surface during driving, forming part of the tread surface of the tread.

A rib is a raised element formed on a tread, this element being delimited by two grooves. A rib comprises two lateral walls and a contact face, the latter being intended to come into contact with the road surface.

A radial direction means a direction perpendicular to the axis of rotation of the tire (this direction corresponds to the direction of the thickness of the tread).

An axial direction means a direction parallel to the axis of rotation of the tire.

A circumferential direction means a direction which is tangential to any circle centred on the axis of rotation. This direction is perpendicular both to the axial direction and to a radial direction.

SUMMARY

Disclosed herein is a groove closure device which is easier to mould and to release from the mould in comparison with the known devices formed of blades secured to one of the walls delimiting a groove. Use of this device may apply to any type of groove, whether this groove runs circumferentially, transversely or obliquely.

To this end, an embodiment of the invention is a tread for a tire, this tread having a tread surface intended to come into contact with a road surface and comprising at least one groove of width W and of depth D delimited by two walls facing one another, these walls being joined together by a groove bottom, at least one groove comprising at least one flexible device for at least partially closing this groove as it passes through the contact patch, each flexible device comprising at least one blade of a suitable thickness that allows it to flex under the effect of a circulation of liquid, this at least one blade being borne by a wall delimiting the groove, each blade of thickness E being bounded by a bottom wall facing the bottom of the groove, an end wall facing the other wall of the groove and a contact wall intended to come into contact with the road surface and lateral walls spaced apart by a distance equal to the thickness E of the blade.

This tread is furthermore characterized in that the bottom wall of the blade comprises a first part referred to as connection part and a second part extending the first part up to the end part of the blade, the connection part being offset towards the outside of the tread (i.e. towards the tread surface) with respect to the second part of the bottom wall of the blade. In this way, a notch is formed in the bottom wall of the blade and this notch is formed near the wall to which the blade is attached, this notch being connected to a lateral wall that bounds the groove. The presence of this notch, aside from making release from the mould easier, makes it possible to increase the flexibility of the blade. This increase in flexibility is a combined function of the height of the notch and of the width of the notch. The height of the notch is measured in the direction of the depth of the groove. The width of the notch is measured in the direction of the width of the groove.

In the context of embodiments of the invention, the expression "wall bearing the blade" must be interpreted here as referring to one of the lateral walls that delimit the groove.

By virtue of embodiments of the invention it is possible to reduce the forces during release of the tire from the mould and thus obtain blades the geometry of which is unaffected by this mould release.

Advantageously, and when the tread is new, the connection part extends between a point K of connection with the wall bearing the blade and a point I corresponding to the point of transition with the second part. The point K of connection with the wall bearing the blade is, in the new state, a distance marked Dk from the tread surface. The point I of transition with the second part corresponds more or less to the point at which the curvature between the first and second part of the bottom wall changes sign.

Advantageously, the connection part for connection with the wall bearing the blade extends over a width D at most equal to 50% of the width L of the blade measured on the bottom part of the said blade (this width L is measured between the point K and the end wall of the blade). For preference, the shortest distance D1 separating the points of this connection part from the tread surface is at least 5% smaller than the maximum distance D2 of the points of the second part of the bottom wall measured with respect to the same tread surface.

Advantageously, the tread is such that, in the new state, the distance D1 separating the points of the connection part from the tread surface is at least 15% smaller than the maximum distance D2 of the points of the second part of the bottom wall measured with respect to the same tread surface.

Advantageously, the connection part may itself be formed of several parts, at least one of these parts having a small radius of curvature, i.e. a radius at least equal to 5% of the width W of the groove and at most equal to 30% of the same width W.

In an advantageous alternative form, the connection part is formed by a succession of curved profiles joined together (this case may notably correspond to the case where arcs of a circle succeed one another) or alternatively of a single profile with a single curvature (arc of a circle).

By virtue of embodiments of this invention, making the notch in the bottom wall of each blade is advantageous because beyond a certain level of tread and blade wear, what remains of each blade will be able to detach from the wall of the groove and be ejected. In this way, a completely free passage for the circulation of water when driving on a wet road surface is thus re-established. It should be noted that when wear exceeds 50% of the height of the tread, the problem of noise associated with resonance in the grooves is appreciably lessened and therefore no longer requires any noise suppressor device.

Advantageously, the profile of the second part of the bottom wall of the blade is parallel to the profile of the bottom of the groove.

Advantageously, the distance separating the second part of the bottom wall from the bottom of the groove is at most equal to 10% of the depth of the groove.

In an advantageous alternative form, a notch is formed between each blade and the wall bearing the said blade in the connecting part situated near the tread surface in the new state. This notch increases the flexural flexibility of each blade. This notch may adopt the form of an incision of narrow width or even zero width.

Other features and advantages of embodiments of the invention will emerge from the description given hereinafter with reference to the attached drawings which, by way of nonlimiting examples, show alternative forms of embodiment of the subject matter of the invention.

BRIEF DESCRIPTION OF THE FIGURES

FIG. 1 shows an alternative form of a device comprising two blades according to the invention;

FIG. 2 shows another alternative form of a device comprising two blades according to the invention and for which the connection parts are elongated;

FIG. 3 shows a view of a single blade almost entirely obstructing a groove in a tread according to the invention.

DETAILED DESCRIPTION OF SPECIFIC EMBODIMENTS

In the figures accompanying this description, like reference signs may be used to describe alternative forms of the invention when these reference signs refer to elements of the same kind, whether this kind is structural or even functional.

FIG. 1 shows, in cross section, a partial view of a tread according to the invention with which a tire of size 225/55 R17 is equipped. This figure depicts a groove 1 bounded by two raised elements 2, 3 of the tread, this groove 1 extending substantially in a circumferential direction of the tire on which said tread is fitted. This groove 1, of width W—measured on the tread surface in the new state, equal to 13 mm and of depth P equal to 7.5 mm, is bounded by a first wall 20 and a second wall 30 which face one another and a groove bottom 10 joining these two walls together. The tread comprises a tread surface 100 intended to be in contact with a road surface during driving. In what follows, the bottom wall of the groove corresponds to that part of the groove that remains after the tread has been worn down to the legal limit set by national regulations.

This groove 1 comprises a noise suppressor device formed by a plurality of flexible obstacles moulded into the said groove. Each obstacle comprises two blades 4, 4' each occupying half the cross section of the groove 1, these blades 4, 4' being in the extension of one another. Each blade 4, 4' projects from a respective wall 20, 30.

Moulded onto the first wall 20 is a first blade 4 of small thickness (i.e. in this instance of a thickness equal to 0.6 mm) so that it can easily flex about an axis substantially along the connection between this first blade 4 and the wall 20 to which it is connected with a view to allowing water to flow along the groove 1 when driving on a wet road surface while at the same time acting as an obstacle to the circulation of air when driving on a dry road surface.

This first blade 4 is bounded by a bottom wall 40 that faces the bottom 10 of the groove, an end wall 41 that faces the second wall 30 of the groove 1 and a contact wall 42 intended to come into contact with the road surface and lateral walls 43, 44 spaced apart by a distance equal to the thickness of the blade.

Each blade 4, 4' has a width L equal to 6 mm, this width being measured in the direction of the width W of the groove 1.

The bottom wall of the first blade 4 comprises a first part referred to as the connection part 401 for connection with the wall 20 bearing this blade, this connection part 401 having a semi-circular profile the centre of curvature of which is located on the side of the bottom 10 of the groove and the radius of curvature of which is, in this instance, equal to 1 mm, namely 17% of the width W of the groove.

"Located on the side of the bottom 10 of the groove" must be understood as meaning that the connection part 401 forms a sort of notch in the blade, the concavity of this notch facing towards the bottom 10 of the groove. Moreover, the connection part 401 is extended by a substantially rectilinear additional part 402 as far as the end part 41 of the blade 4.

The junction between the connection part 401 and the additional part 402 occurs—in the view in cross section that is FIG. 1—at a point of inflexion I. The connection part 401 terminates at its other end on the lateral wall 20 at a point K which is situated at a distance Dk from the tread surface in the new state which distance is greater than the total thickness of material that can be worn away before the tire has to be replaced on a vehicle after running (in this instance Dk is equal to 7.3 mm).

It will be noted that, on the whole, all of the points of the connection part 401 that form a notch—with the notable exception of the point K of connection between this connection part 401 and the wall 20 bearing the blade 4 and the point I in common with the additional part 402 of the bottom wall of the blade, are closer to the tread surface 100 in the new state than the points of the additional part with respect to the same tread surface.

Formed in combination with this first blade 4 is a second blade 4' of the same geometry, this second blade being connected to the second wall 30 situated facing the first wall 4 so as to close off almost all of the cross section of the groove. In the scenario depicted, the first blade 4 and the second blade 4' are formed in such a way as to have their respective end parts facing one another after the tread has been moulded.

By virtue of this arrangement it is easier to mould a plurality of blades that form a device that attenuates resonant air noise in the groove.

Moreover, and as a person skilled in the art will be able to imagine, after there has been enough wear that the points of the connection part that are situated closest to the tread surface are reached, the blades detach from the tread and thus free up the entire remaining cross section of the groove, something which is advantageous from the point of view of flow of liquid through the remaining groove.

This is why it may be advantageous to plan for the distance D1 which in the new state separates the tread surface 100 from those points of the connection part that are closest to this same tread surface to be smaller than the thickness of material available to be worn away during running. The latter thickness is indicated on the tire by the presence of at least one tire tread wear indicator formed as a raised feature in the bottom of a groove. It is therefore sensible for the distance D1 at which the points of the connection part 401 closest to the tread surface 100 in the new state are situated to be smaller than the distance between the tire tread wear indicator and this same surface.

In the alternative form shown in FIG. 2, the noise suppressor device is made up of a plurality of pairs of blades 4, 4', a first blade 4 being secured to a wall 20 delimiting the groove 1 and a second blade 4' being secured to the wall 30 opposite. The geometric characteristics of these blades 4, 4' are substantially the same as those of the blades of the alternative form shown in FIG. 1 except that the profile of the connection part 401, 401' and respectively of the blades 4, 4' with the walls delimiting the groove 1 is of elongate shape. The maximum height Hr of this oblong shape measured between the point of the connection part closest to the tread surface 100 and the point K of connection with the wall determines the level of wear D1 beyond which the resonant noise can be considered no longer to be a dominant component in the road noise and that therefore there need no longer be any obstacles obstructing the groove.

In this alternative form, the connection part 401 comprises a succession of parts of different curvatures: C1, C2, C3, the intermediate curvature C2 being greater than the other two curvatures C1 and C3. The curvatures C1 and C3 are practically zero in this alternative form. In this particular instance, the blades are detached from the tread well before the tire tread wear limit as indicated, for example, by a tire tread wear indicator, is reached.

Furthermore, in this alternative form, the additional part 402, 402', of each blade 4, 4 respectively, follows more or less and from a very small distance (in this case of the order of 0.5 mm) the geometry, viewed in cross section, of the bottom wall 10 of the groove 1 so as to further improve the efficiency of the noise suppressor device.

In this alternative form, the width D of the connection part corresponds more or less to twice the radius of curvature of the part C2.

The alternative form of the invention shown in FIG. 3 deals with a resonant-noise suppressor device in a groove 1, this device comprising just one single blade 4 for transversely closing off the cross section of this groove 1. The connection part 401 is in the shape of a semicircle of which the end points K and I are situated substantially on one and the same straight line parallel to a straight line tangential to the tread surface 100. Between the additional part 402 of the bottom wall of the blade 4 and the connection part 401 there has been provided a small curved part 403 the centre of curvature of which is situated within the blade in order to round off the corner formed between these two parts.

In this alternative form, another notch 5 is furthermore formed in that part of the blade that is situated near the tread surface 100, this other notch reducing the length of connection Li between the blade 4 and the wall 20. This notch 5, which is easy to mould, by reducing the length of connection Li increases the flexural flexibility of the blade about an axis parallel to the wall 20 and extending in the direction of the depth of the groove 1. In order to achieve the reduction in noise desired by the presence of this obstacle it is of course sensible to choose the width dimension of this notch 5 such that it is as small as possible. In an alternative form that has not been shown here, this notch 5 may take the form of an incision of small width—i.e. at most 0.6 mm—or even of zero width. The width of the notch 5 is measured in the direction of the width of the groove 1.

As the invention has been described in general terms and using a number of alternative forms, it must be appreciated that this invention is not restricted to these variations described and depicted alone. The various alternative forms that have been described here can be combined with one another by a person skilled in the art to suit the pursued objective.

It is clear that various modifications can be made to them without departing from the overall scope of the present invention. In particular, all the alternative forms described here show blades the contact wall of which is offset slightly towards the inside with respect to the tread surface in the new state, but it is entirely possible to provide them at the same level or even offset slightly towards the outside of that same tread surface. It is equally possible to form a closure device comprising two blades according to the invention, these blades being offset relative to one another in the main direction of the groove in which the said closure device is formed.

The invention claimed is:

1. A tread for a tire, this tread having a tread surface intended to come into contact with a road surface and comprising at least one groove of width W and of depth P delimited by two walls facing one another, these walls being joined together by a groove bottom, the at least one groove comprising at least one flexible device for at least partially closing this groove as it passes through the contact patch, each flexible device comprising at least one blade of a suitable thickness that allows it to flex under the effect of a circulation of liquid, this at least one blade being borne by a wall delimiting the groove, each blade of thickness E being bounded by a bottom wall facing the bottom of the groove, an end wall facing the other wall of the groove and a contact wall intended to come into contact with the road surface and lateral walls spaced apart by a distance equal to the thickness E of the blade, wherein the bottom wall of the blade comprises a first part referred to as connection part and a second part extending the first part up to the end part of the blade, the connection part being offset towards the outside of the tread with respect to the second part of the bottom wall of the blade so as to form a notch, a distance D1 separating the points of the connection part from the tread surface in the new state is at least 5% smaller than a maximum distance D2 of the points of the second part of the bottom wall measured with respect to the same tread surface, and in that the connection part for connection with the wall bearing the blade extends over a width D at most equal to 50% of a width L of the blade measured on the bottom part of the said blade.

2. The tread according to claim 1, wherein the connection part is formed of several parts, at least one of these parts having a small radius of curvature, i.e. a radius at least equal to 5% of the width W of the groove and at most equal to 30% of the same width W.

3. The tread according to claim 1, wherein a connection part is formed of a single profile with a single curvature.

4. The tread according to claim 1, wherein the profile of the second part of the bottom wall of the blade is parallel to profile of the bottom of the groove.

5. The tread according to claim 1, wherein a distance separating the second part of the bottom wall from the bottom of the groove is at most equal to 10% of the depth of the groove.

6. The tread according to claim 1, further comprising a notch is formed between each blade and the wall bearing the said blade in the connecting part situated near the tread surface in the new state.

\* \* \* \* \*